United States Patent [19]  [11]  4,137,362
Miki et al.  [45]  Jan. 30, 1979

[54] PRESSURE SENSITIVE ADHESIVE TAPES

[75] Inventors: Yoshio Miki; Hideo Nishizawa; Yukio Suzuki, all of Ibaraki, Japan

[73] Assignee: Nitto Electric Industrial Co., Ltd., Ibaraki, Japan

[21] Appl. No.: 767,421

[22] Filed: Feb. 10, 1977

Related U.S. Application Data

[63] Continuation of Ser. No. 501,109, Aug. 27, 1974, abandoned.

[30] Foreign Application Priority Data

Aug. 27, 1973 [JP] Japan .................................. 48-95825

[51] Int. Cl.² .......................... B32B 27/32; C09J 7/02
[52] U.S. Cl. ..................................... 428/337; 428/339; 428/343; 428/355; 428/356; 428/352; 428/353; 428/354; 428/520; 428/515; 428/516; 428/519; 428/910; 428/433; 215/232; 215/233; 264/288; 264/289
[58] Field of Search ...................... 264/288, 289, 290; 428/433, 910, 343, 337, 339, 355–356, 352–354, 520, 516, 515, 519; 215/232, 233

[56] References Cited

U.S. PATENT DOCUMENTS

| 3,241,662 | 3/1966 | Robinson et al. ................ 428/910 X |
| 3,271,495 | 9/1966 | Gronholz et al. .................... 264/210 |
| 3,372,049 | 3/1968 | Schaffhausen ........................ 428/343 |
| 3,732,122 | 5/1973 | Fehrn-Christensen ........ 117/122 PF |
| 3,758,661 | 9/1973 | Yamamoto et al. .................. 264/230 |
| 3,816,584 | 6/1974 | Schmidt .............................. 264/289 |
| 3,887,745 | 6/1975 | Yoshi et al. ...................... 428/516 X |

Primary Examiner—P. C. Ives
Attorney, Agent, or Firm—Sughrue, Rothwell, Mion, Zinn and Macpeak

[57] ABSTRACT

A pressure sensitive adhesive tape comprising a backing and a pressure sensitive adhesive layer, wherein the backing is produced by stretching a long sheet composed of polypropylene as a main component in the substantially transverse direction, the backing having the properties that the shock edge tearing resistance is below 200g, the elongation at break is above 200% in the lengthwise direction, the tensile strength is above 170 kg/cm² in the lengthwise direction and above 800kg/cm² in the transverse direction and the impact strength is above 15kg.cm/mm² in the lengthwise direction and above 40kg.cm/mm² in the transverse direction, and the backing having a thickness of about 10 to 300 microns.

21 Claims, 2 Drawing Figures

U.S. Patent     Jan. 30, 1979     4,137,362
FIG.1
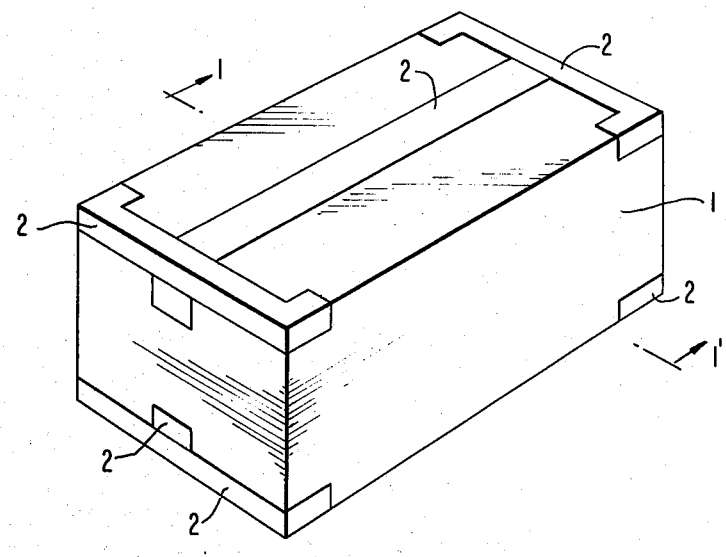
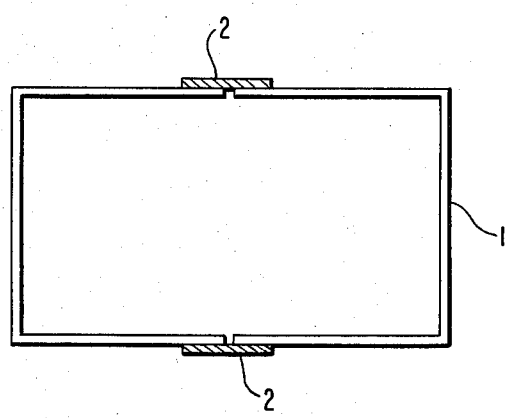
FIG.2

PRESSURE SENSITIVE ADHESIVE TAPES

BACKGROUND OF THE INVENTION

1. Field of the Invention

The present invention relates to pressure sensitive adhesive tapes having good strength in the transverse direction which can be easily cut using the fingers without using any special tool or cutter.

2. Description of the Prior Art

Pressure sensitive adhesive tapes are required to have a large strength in the transverse direction of the pressure sensitive adhesive tapes, for example, where they are used for sealing the covers of cartons. Hitherto, as such pressure sensitive adhesive tapes for sealing cartons, pressure sensitive kraft paper tapes and gum tapes have been used. Where the contents of the carton are relatively heavy in weight, pressure sensitive cloth tapes and pressure sensitive adhesive tapes having a hard polyvinyl chloride film or a polypropylene film which was stretched in the lengthwise direction as a backing have been used from the standpoint of practical strength. Pressure sensitive adhesive tapes having such a plastic film as the backing have many advantages as compared with pressure sensitive adhesive tapes having a cloth or paper as the backing in that they have good water resistance, in that they are inexpensive, in that they can be produced so as to be endurable for overwrapping uses as they exhibit an resistance reisistance to lamination, and in that they are excellent in strength. However, they have the defects that it is very difficult to cut them with the fingers or they can not be cut in their transverse direction but are obliquely cut or many creases result on the cut parts even if they can be cut. Accordingly, the ability to use these pressure sensitive adhesive tapes for sealing is poor because it is necessary to use special tools or cutters. Further, since they have poor strength in the transverse direction, they are not suitable as a pressure sensitive adhesive tape which must have strength in the transverse direction such as for sealing cartons, etc.

On the other hand, it has been suggested to stretch plastic film backings in the lengthwise direction while stretching the backing in the transverse direction so that the pressure sensitive adhesive tapes are easily cut with the fingers and the strength in the transverse direction increases. However, it has been believed that such adhesive tapes produced by applying an adhesive to the ordinarily stretched backing will not be able to be practically used because they have poor strength in the lengthwise direction and that they will break during unwinding on use because they are not strong enough to endure the unwinding force. Thus the utility of such adhesive tapes has been overlooked.

SUMMARY OF THE INVENTION

As the result of a reexamination of the utility and studies on improving the above described defects, the present invention has been accomplished.

It has been found that pressure sensitive adhesive tapes having good strength in the transverse direction which can be easily cut with the fingers and which do not break during unwinding can be obtained by using as a backing a film comprising polypropylene as a main component having the following properties which is obtained by substantially stretching in the substantially transverse direction of the tape.

The present invention provides a pressure sensitive adhesive tape comprising a backing having a pressure sensitive adhesive layer, wherein the backing is produced by stretching a long sheet of polypropylene as the main component in a substantially transverse direction to the lengthwise direction of the tape to be produced, the backing having the properties that the shock edge tearing resistance is below 200 g, the elongation at break is above 200% in the lengthwise direction, the tensile strength is above 170kg/cm$^2$ in the lengthwise direction and above 800kg/cm$^2$ in the transverse direction and impact strength is above 15kg.cm/mm$^2$ in the lengthwise direction and above 40kg.cm/mm$^2$ in the transverse direction, and the backing has a thickness of about 10 to 300 microns.

BRIEF DESCRIPTION OF THE DRAWINGS

FIG. 1 is an oblique view which shows the sealing of a carton using the pressure sensitive adhesive tape of the present invention, and FIG. 2 is a sectional view at the line 1 — 1' in FIG. 1 wherein 1 is the carton and 2 is the pressure sensitive adhesive tape.

DETAILED DESCRIPTION OF PREFERRED EMBODIMENTS

As the sheet of polypropylene as the main component, sheets obtained from polypropylene and polyethylene are preferably used in the present invention.

The polypropylene which can be used in the present invention ususally means isotactic polypropylene which is produced by polymerization using a coordination catalyst for providing a stereo-specific structure. However, any polypropylene can be used if it has an isotactic degree above 80%. Furthermore, propylene-ethylene copolymers containing less than 15% by weight of an ethylene component can be used in the present invention.

Usually, polypropylene having an intrinsic viscosity (as measured in tetralin at 135° C) of about 1.5 to 3.0 are used. Examples of such polypropylenes include Sumitomo Noblen (trade name, produced by Sumitomo Chemical Co., Ltd.), Mitsui Noblen (trade name, produced by Mitsui Toatsu Chemical Inc.), Mitsubishi Noblen (trade name, produced by Mitsubishi Petro-Chemical Co., Ltd.) and Chissopolypro (trade name, produced by Chisso Corp.).

The polyethylene for mixing with the polypropylene can be used in an amount of below 40% by weight and preferably at 20 to 30% by weight based on the total weight of the polyethylene and polypropylene. If films obtained by stretching a sheet obtained from a polypropylene-polyethylene composition containing above 40% by weight of polyethylene are used as the backing for the pressure sensitive adhesive tapes, it is impossible to produce pressure sensitive adhesive tapes of the present invention, because the cutting property by the fingers, the unwinding property and strength in the transverse direction thereof are not sufficient.

Examples of available polyethylenes include Ube Polyethylene (trade name, produced by Ube Industries, Ltd.), Sholex (trade name, produced by Showa Denko K.K.), NUC Polyethylene (trade name, produced by Nippon Unika K.K.) and Hizex (trade name, produced by Mitsui Petrochemical Industries, Ltd.).

In the present invention, to stretch in a substantially transverse direction means to intensify the orientation of the molecules in the transverse direction as compared with the lengthwise direction by stretching the sheet comprising the polypropylene as the main component in the transverse direction.

Accordingly, in order to improve the properties, for example, the Young's modulus and coefficient of contraction, etc., of the stretched film in the lengthwise direction, stretching in the slightly lengthwise direction may be effected simultaneously with the stretching in the transverse direction. In the present invention, a stretching ratio in the transverse direction is generally about 4 times or more and preferably 5 to 8 times in the case that sheets of polypropylene as the main component are used.

By stretching in such a stretching ratio, pressure sensitive adhesive tapes having the properties described in the following ranges can be obtained. Where it is necessary to slightly stretch in the lengthwise direction, the stretching ratio in the lengthwise direction is usually below about 3 times and preferably 1.5 times or so.

When a biaxially stretched backing film is used in the present invention, it is preferable that the stretching ratio in the transverse direction be over 1.5 times larger than the stretching ratio in the lengthwise direction.

It has been found that, if the above described ratio is less than 1.5, backings for the pressure sensitive adhesive tapes having the following properties can not be obtained.

The pressure sensitive adhesive tapes can be produced by treating the surfaces of the backing film which is produced by stretching a sheet of polypropylene as the main component in the substantially transverse direction with a corona discharge or with bichromates to carry out a surface oxidation treatment, applying a known adhesive to a surface of the treated film in an amount of about 20 to 50g/m$^2$ on a solid basis, and applying a releasing agent to the other surface thereof. In these pressure sensitive adhesive tapes, the backing should have the following properties for practical use.

(1) The shock edge tearing resistance is below about 200g and preferably in a range of 5 to 40g. This is because the tapes can not be easily cut with the fingers, if the shock edge tearing resistance is above 200g. The shock edge tearing resistance can be measured as follows.

In the method according to JIS C 2318, a sample is provided such that the length thereof is the lengthwise direction of the pressure sensitive adhesive tape. The sample is suspended and a weight is fixed to and supported from the sample by means of a string. Shock edge tearing resistance is determined by raising the weight to a given height and allowing it to fall freely. The shock edge tearing value is the value at which 50% of the samples tear under the force of the free falling weight. The value of the shock edge tearing resistance is determined at 20° C and a testing speed of 4.5m/sec. The resulting value is shown as the shock edge tearing resistance value.

(2) The elongation at break in the lengthwise direction is above about 200% and preferably 400 to 800%. This is because the pressure sensitive adhesive tape rolled on a core breaks on unwinding, if the elongation at break is below about 20%, because the backing can not withstand the variation in the rapid unwinding force at the start of unwinding. The elongation at break can be determined according to JIS Z 1702. A test sample is marked with gauge marks. %E is equal to the ratio of the change in the distance between the gauge marks at the time the sample breaks to the original distance between the gauge marks.

(3) The tensile strength in the lengthwise direction is above about 170kg/cm$^2$ and the tensile strength in the transverse direction is above about 800kg/cm$^2$. Higher tensile strengths are preferred. The tensile strength can be determined according to JIS Z 1702. In accordance with this procedure, a test sample is gripped between two clamps and stretched. The tensile strength is calculated as the breaking load (kg) divided by the minimum cross-sectional area of the specimen.

(4) The impact strength in the lengthwise direction is above about 15kg.cm/mm$^2$ and the impact strength in the transverse direction is above about 40kg.cm/mm$^2$. Higher impact strengths are preferred. The impact strength can be determined as follows.

One end of a rectangular sample having a length of 750mm and a width of 5mm is fixed at 20° C and the other end of the sample is stretched at a testing speed of 2.8m/sec. Then the force necessary to break the sample is measured. The impact strength is shown as the force at break per unit area of the sample.

The reason why the tensile strength in the transverse direction and the impact strength in the transverse direction in the above described items (3) and (4) are limited to the above described ranges is because the pressure sensitive adhesive tapes can not withstand violent handling in transportation and easily break under such conditions when they are used as a sealing tape for cartons, and the danger of scattering the contents of the packages occurs, if the impact strength and the tensile strength are below the above described ranges.

Further, the reason why the tensile strength in the lengthwise direction and the impact strength in the lengthwise direction in the above described items (3) and (4) are limited to the above described ranges is because the pressure sensitive adhesive tape sometimes breaks during a rough taping operation, if they are below the above described values.

(5) The thickness of the backing is about 10 to 300 microns and preferably 50 to 90 microns. This is because the pressure sensitive adhesive tape is too weak, if the backing is thinner than 10 microns. If the backing is thicker than 300 microns, the pressure sensitive adhesive tape lacks flexibility. In any case the working property at taping is very poor. Particularly, if the thickness is above 300 microns, the pressure sensitive adhesive tape can not be rolled and it becomes difficult to form rolls of the adhesive tape. Further it is uneconomical because the backing is too thick. Additionally, if it is desired to make a roll of the pressure sensitive adhesive tape having the same length as that of the common pressure sensitive adhesive tape, the diameter thereof increases and the handling thereof becomes difficult.

As compositions of polypropylene as the main component used for producing the sheet, compositions composed of polypropylene and polyethylene are preferably used in the present invention. However, as the result of studies on sheet-forming materials, it has been found that the same result can be obtained if a thermoplastic resin which is compatible with polypropylene in the molten state such as an ethylene-propylene-diene terpolymer, polyisobutylene or an ethylene-vinyl acetate copolymer is added to the polypropylene in an amount of below about 40% by weight, preferably 20 to 30% by weight.

Of course, it has been experimentally ascertained that two or more of the above described thermoplastic resins including polyethylene can be added to the polypropylene.

Further, a sheet of polypropylene alone can be used as the backing in the present invention. Namely, this sheet is stretched in a substantially transverse direction as described above to produce a backing film and an adhesive is applied thereto to produce a pressure sensitive adhesive tape. If the backing of this pressure sensitive adhesive tape has the above described properties, it can be used in the present invention.

Examples of the above described ethylene-propylene-diene terpolymer which can be used in the present invention include Mitsui EPT (trade name, produced by Mitsui Petrochemical Industries, Ltd.). Esprene EPDM (trade name, produced by Sumitomo Chemical Co.), and TSR-EP (trade name, produced by Nippon Synthetic Rubber Co.).

Examples of polyisobutylene include Vistanex (trade name, produced by Enjay Chemical Co.) and Oppanol B (trade name, produced by BASF AG.).

Examples of ethylene-vinyl acetate copolymers include Evaflex (trade name, produced by Mitsui Petrochemical Co., Ltd.) and Elvax (trade name, produced by Du Pont Co.).

In summary, as described above the polypropylene which can be used as the main component for films according to the present invention are:

(1) polypropylene homopolymers having an isotactic degree above 80%;
(2) propylene-ethylene copolymers containing less than 15% by weight of an ethylene component;
(3) a blend of propylene homopolymers and polyethylene in which the blend contains less than 40% by weight of polyethylene; and
(4) a blend of propylene-ethylene copolymers containing less than 15% by weight of an ethylene component and polyethylene in which the blend contains less than 40% by weight of polyethylene.

In order to produce a pressure sensitive adhesive layer, a conventional solvent type or emulsion type adhesive comprising natural rubber, synthetic rubber or synthetic resin, e.g., as described in U.S. Pat. Nos. 2,750,316 and 2,236,527 is applied directly or through a primer coating layer or a treatment layer to the film which is produced by stretching the sheet of polypropylene as the main component in a substantially transverse direction, and dried at a temperature at which the above described properties of the film do not change, or are kept within the above described range, if the properties change. Further, solid adhesives can be applied by a hot roll coating process or a melt extrusion coating process.

Furthermore, a releasing agent such as silicone resin may be applied to the other surface of the film. Suitable releasing agents are described in U.S. Pat. Nos. 2,607,711 and 2,532,011.

In the following, the present invention will be illustrated in greater detail by reference to the examples. However, the present invention is not to be construed as being limited to these examples only. Unless otherwise indicated, all parts, percents ratios and the like are by weight.

The adhesive, the primer and the releasing agent used in examples were as follows.

| Adhesive: | parts by weight |
|---|---|
| Natural Rubber | 100 |
| Polyterpene Resin | 50 |
| Toluene | 440 |

| Primer: | parts by weight |
|---|---|
| Chlorobutadiene Rubber | 20 |
| Phenol-formaldehyde Resin | 15 |
| Toluene | 150 |

Releasing Agent:
A toluene solution containing 1% of the reaction product of N-octadecylisocyanate and soluble starch.

EXAMPLE 1

80 parts by weight of isotactic polypropylene pellets (intrinsic viscosity: 2.0) and 20 parts by weight of polyethylene pellets having a low density (specific gravity: 0.921; melt index by ASTM D 1238: 32) were blended in a blending device. The mixture was extruded in a melted condition from a T-die using a conventional extruder to produce a sheet having a thickness of 480 microns.

The resulting sheet was stretched 7.0 times in the transverse direction at 130° – 170° C using a tenter and then the sheet was subjected to heat treatment to an annealing percent of 5 – 8% to produce a backing film.

Both surfaces of the resulting backing film were treated with corona discharging to a wet tension of 40 dynes. Then the above described pressure sensitive adhesive, the primer and the releasing agent were applied thereto at a temperature at which the properties of the film did not substantially change using an application device to produce a pressure sensitive adhesive tape having a width of 1m. After rolling on a paper core, the pressure sensitive tape was cut to make rolls of a pressure sensitive adhesive tape having a width of 50mm.

EXAMPLES 2 TO 12 AND COMPARISON EXAMPLES 1 TO 4

Rolls of a pressure sensitive adhesive tape were produced using the same method as described in Example 1. The conditions employed are shown in Table 1.

Table 1

| Example No. | Sheet Forming Component (part by weight) | | | | | | Thickness (micron) | Stretching Ratio | |
|---|---|---|---|---|---|---|---|---|---|
| | PP | PPE | PE | EPT | EVA | PIB | | MD | TD |
| Example 2 | 80 | — | 30 | — | — | — | 660 | 1.5 | 7.5 |
| " 3 | 82 | — | 18 | — | — | — | 390 | 1.0 | 8.0 |
| " 4 | 76 | — | 34 | — | — | — | 1200 | 1.7 | 9.0 |
| " 5 | — | 95 | 5 | — | — | — | 1300 | 2.0 | 7.0 |
| " 6 | 100 | — | — | — | — | — | 440 | 1.0 | 4.0 |
| " 7 | — | 100 | — | — | — | — | 620 | 1.2 | 4.5 |

Table 1-continued

| Example No. | | PP | PPE | PE | EPT | EVA | PIB | Thickness (micron) | Stretching Ratio MD | Stretching Ratio TD |
|---|---|---|---|---|---|---|---|---|---|---|
| " | 8 | — | 90 | — | 10 | — | — | 520 | 1.0 | 7.5 |
| " | 9 | 75 | — | 20 | — | — | 5 | 600 | 1.5 | 6.0 |
| " | 10 | 85 | — | 13 | — | 2 | — | 470 | 1.0 | 7.0 |
| " | 11 | 82 | — | 15 | 3 | — | — | 920 | 1.5 | 7.2 |
| " | 12 | 80 | — | 20 | — | — | — | 650 | 1.5 | 7.5 |
| Comparison Example | 1 | 80 | — | 20 | — | — | — | 2300 | 1.0 | 6.0 |
| " | 2 | 100 | — | — | — | — | — | 510 | 1.0 | 8.5 |
| " | 3 | 50 | — | 50 | — | — | — | 120 | 1.0 | 3.0 |
| " | 4 | 100 | — | — | — | — | — | 3300 | 6.5 | 8.5 |

In Table 1, PP means polypropylene. The PP used in Examples 2, 9, 11, 12 and Comparison 1 and 2 was that having an intrinsic viscosity of 2.0 and the PP used in Examples 3, 4 and 6 was that having an intrinsic viscosity of 1.6. The PP used in Comparison 3 and 4 was that having an inrinsic viscosity of 2.7.

PPE means a propylene polymer having an intrinsic viscosity of 2.5 and an insotactic degree of 97% produced by copolymerizing 1.0% by weight of an ethylene component.

PE means polyethylene, which was the same as used in Example 1.

EPT means an ethylene-propylene-diene terpolymer (intrinsic viscosity: 2.0) wherein the proportion of ethylene is nearly equal to that of the propylene.

EVA means an ethylene-vinyl acetate copolymer (vinyl acetate content: 12% by weight; melt index: 3.5g/10 minutes — measured according to ASTM D 1238).

PIB is a polyisobutylene having an average molecular weight of about 200,000.

MD means the stretching ratio in the lengthwise direction and TD means the stretching ratio in the transverse direction.

In the case that the sheet is slightly stretched in the lengthwise direction in Table 1, the sheet was stretched at a stretching temperature of 120° – 130° C by passing the sheet on metal rolls after stretching in the transverse direction and carrying out a heat treatment to an annealing percent of 5 – 8%.

The characteristics of the rolls of the pressure sensitive adhesive tapes produced by Examples 1 to 12 and Comparison Examples 1 to 4 are shown in Table 2.

Table 2

Properties of the Backing of the Pressure Sensitive Adhesive Tape

| Example No. | | Thickness (micron) | Shock Edge Tearing Resistance (g) | Tensile Strength (kg/cm$^2$) MD | Tensile Strength (kg/cm$^2$) TD | Elongation at Break (%) MD | Impact Strength (kg.cm/mm$^2$) MD | Impact Strength (kg.cm/mm$^2$) TD |
|---|---|---|---|---|---|---|---|---|
| Example | 1 | 70 | 25 | 340 | 1200 | 620 | 23 | 170 |
| " | 2 | 60 | 25 | 380 | 1300 | 450 | 25 | 185 |
| " | 3 | 50 | 10 | 330 | 1400 | 600 | 22 | 170 |
| " | 4 | 80 | 25 | 400 | 1600 | 400 | 33 | 240 |
| " | 5 | 100 | 60 | 420 | 1250 | 250 | 38 | 175 |
| " | 6 | 110 | 60 | 270 | 850 | 220 | 16 | 80 |
| " | 7 | 120 | 70 | 320 | 840 | 250 | 17 | 75 |
| " | 8 | 70 | 40 | 300 | 1500 | 250 | 20 | 180 |
| " | 9 | 70 | C370 | 1000 | 600 | 21 | 150 | |
| " | 10 | 70 | 30 | 300 | 1100 | 680 | 20 | 180 |
| " | 11 | 90 | 50 | 370 | 1200 | 350 | 30 | 170 |
| " | 12 | 60 | 90 | 500 | 1500 | 300 | 35 | 200 |
| Comparison Example | 1 | 400 | 400 | 360 | 1000 | 700 | 20 | 160 |
| " | 2 | 60 | 5 | 280 | 2200 | 30 | 11 | 200 |
| " | 3 | 40 | 100 | 200 | 600 | 220 | 12 | 50 |
| " | 4 | 60 | above 500 | 1200 | 2100 | 100 | 175 | 220 |

Properties of the Backing of the Pressure Sensitive Adhesive Tape

| Ease of Cutting by the Fingers | Unwindability | Practical Strength | Working Property at Taping |
|---|---|---|---|
| O | O | O | A |
| O | O | O | A |
| O | O | O | A |
| O | O | O | B |
| O | O | O | A |
| O | O | O | A |
| O | O | O | A |
| O | O | O | A |
| O | O | O | A |
| O | O | O | B |
| O | O | O | A |
| O | O | O | C |
| X | O | O | C |
| O | X | O | C |
| Δ | O | X | B |
| X | O | O | C |

In Table 2, the properties of the backings of the pressure sensitive adhesive tape were measured by the above described methods.

The characteristics of the pressure sensitive adhesive tapes were evaluated as follows.

(I) Ease of Cutting with the Fingers

O means that the pressure sensitive adhesive tape was easily cut in the transverse direction (the direction perpendicular to the lengthwise direction of the pressure sensitive adhesive tape) by using only the fingers of both hands without using any tool. X means that it is difficult to cut with the fingers. Δ means a middle condition between the above described two cases.

(II) Unwindability

O means that the pressure sensitive adhesive tape does not break when it is unwound at 30m/min and X means that the pressure sensitive adhesive tape breaks when it is unwound at about 30m/min. In these cases, the force necessary to unwind is 400 – 1600g/50mm of width.

(III) Working Property at Taping

The pressure sensitive adhesive tapes were adhered to uniformly packed cartons (30cm × 30cm × 50cm) having a weight of 30kg by three workers, and the adhering operation was carried out with 10 cases for every three workers. Of course the pressure sensitive adhesive tapes were cut using the fingers without using any cutter. The pressure sensitive adhesive tapes were adhered in the form of the letter H to the upper and lower covers of cartons as shown in the appended drawings.

In the drawings, 1 is a carton and 2 is pressure sensitive adhesive tapes adhered to the carton covers. The ratio of failure in operation, that is, a normal sealing operation can not be practiced when cut using the fingers of one hand, because the pressure sensitive adhesive tape stretches and can not be cut, it is cut obliquely, it breaks at a part other than the desired part to be cut by the fingers, or it breaks at unwinding, is counted. Less than 10% failures in operation was evaluated as a grade of A, less than 20% failures in operation was evaluated as a grade of B and more than 20% failures in operation was evaluated as a grade of C.

(IV) Practical Strength

Using the cartons normally sealed in (III), a hexagonal drum rolling test and a drop impact test shown in JIS Z 0209 were carried out. In the hexagonal drum rolling test, the damaged condition of the pressure sensitive adhesive tape was observed after repeated the rolling until N = 29 calculated by the equation shown in the above described JIS. In the drop impact test, the damaged condition of the pressure sensitive adhesive tape was observed after an impact of one time each of the upper cover and the lower cover at a dropping height of 1 meter. In the above described two tests, where the pressure sensitive adhesive tape was not damaged was evaluated as O and where the pressure sensitive adhesive tape was damaged was evaluated as X.

In Examples 1 to 12, the properties of the backings of the pressure sensitive adhesive tapes are all in the above described range and, consequently, the properties required for practical use such as practical strength, ease of cutting with the fingers, unwindability and working property at taping, etc. were sufficiently satisfied. On the contrary, in Comparisons 1 to 4, only some of the properties could be satisfied, since at least one of the properties departed from the above described ranges.

As was described above, the pressure sensitive adhesive tapes of the present invention have excellent strength in the transverse direction and can be easily cut with the fingers. Further, they do not break on unwinding from the roll and have a good working property in taping of cartons, etc.

The present invention has been explained with reference to pressure sensitive adhesive tapes having a pressure sensitive adhesive layer on one surface of the backing. However, a pressure sensitive adhesive layer can be provided on both surfaces of the backing to make double-faced pressure sensitive adhesive tapes, which are included in the scope of the present invention. These doublefaced pressure sensitive adhesive tapes can be suitably used for binding articles, since they are easily cut using the fingers.

While the invention has been described in detail and with reference to specific embodiments thereof, it will be apparent to one skilled in the art that various changes and modifications can be made therein without departing from the spirit and scope thereof.

What is claimed is:

1. In a pressure sensitive adhesive tape for sealing cartons comprising a backing having thereon a pressure sensitive adhesive layer, the improvement which comprises said backing consisting of a unitary sheet having lengthwise and transverse directions of polypropylene as a main component stretched in the substantially transverse direction such that the stretching ratio in the transverse direction is at least 4 and the sheet is not stretched lengthwise or the stretching ratio in the lengthwise direction is less than 3 and having a shock edge tearing resistance of below about 200g, an elongation at break in the lengthwise direction of the tape of above about 200%, a tensile strength in the lengthwise direction of the tape of above about 170 kg/cm$^2$, a tensile strength in the transverse direction of the tape of above about 800 kg/cm$^2$, an impact strength in the lengthwise direction of the tape of above about 15 kg.cm/mm$^2$ and above 40 kg.cm/mm$^2$ in the transverse direction, and a thickness of about 10 to 300 microns.

2. The pressure sensitive adhesive tape of claim 1, wherein said polypropylene has an isotactic degree of above 80%.

3. The pressure sensitive adhesive tape of claim 1, wherein said polypropylene is a copolymer of propylene with less than about 15% by weight of ethylene.

4. The pressure sensitive adhesive tape of claim 1, wherein said sheet comprises a mixture of components 1 and 2 where component 1 is polypropylene and component 2 is selected from the group consisting of polyethylene, an ethylene-propylenediene terpolymer, polyisobutylene, an ethylene-vinyl acetate copolymer, and mixtures thereof, with said component 1 being present in an amount of at least 60% by weight.

5. The pressure sensitive adhesive tape of claim 1, wherein said shock edge tearing resistance ranges from 5 to 40g, said elongation at break in the lengthwise direction of said tape is 400 to 800%, and said thickness of said tape is 50 to 90 microns.

6. The pressure sensitive adhesive tape of claim 4, wherein said polypropylene is a copolymer of propylene with less than 15% by weight of ethylene.

7. The pressure sensitive adhesive tape of claim 4, wherein said mixture contains 20 to 30% by weight of said polyethylene, ethylene-propylene-diene terpolymer, polyisobutylene, ethylenevinyl acetate copolymer or a mixture thereof.

8. The pressure sensitive adhesive tape of claim 1, wherein said polypropylene has an intrinsic viscosity of about 1.5 to 3.0.

9. The pressure sensitive adhesive tape of claim 1, wherein the stretching ratio of said sheet in the transverse direction is about 4 times or greater.

10. The pressure sensitive adhesive tape of claim 1, wherein said sheet is stretched in the lengthwise direction but the stretching ratio in the lengthwise direction is less than 3.

11. The pressure sensitive adhesive tape of claim 9, wherein said stretching ratio is 5 to 8 times.

12. The pressure sensitive adhesive tape of claim 10, wherein said stretching ratio is about 1.5.

13. The pressure sensitive adhesive tape of claim 10, wherein the stretching ratio in the transverse direction is 1.5 times or greater than the stretching ratio in the lengthwise direction.

14. The pressure sensitive adhesive tape of claim 1, wherein said unitary sheet is stretched such that the stretching ratio in the transverse direction is more than 1.5 times the stretching ratio in the lengthwise direction.

15. The pressure sensitive adhesive tape of claim 2, wherein said unitary sheet is stretched such that the stretching ratio in the transverse direction is more than 1.5 times the stretching ratio in the lengthwise direction.

16. The pressure sensitive adhesive tape of claim 3, wherein said unitary sheet is stretched such that the stretching ratio in the transverse direction is more than 1.5 times the stretching ratio in the lengthwise direction.

17. The pressure sensitive adhesive tape of claim 4, wherein said unitary sheet is stretched such that the stretching ratio in the transverse direction is more than 1.5 times the stretching ratio in the lengthwise direction.

18. The pressure sensitive adhesive tape of claim 1, wherein said unitary sheet is stretched such that the stretching ratio in the transverse direction is 5 to 8 and also more than 1.5 times the stretching ratio in the lengthwise direction.

19. The pressure sensitive adhesive tape of claim 2, wherein said unitary sheet is stretched such that the stretching ratio in the transverse direction is 5 to 8 and also more than 1.5 times the stretching ratio in the lengthwise direction.

20. The pressure sensitive adhesive tape of claim 3, wherein said unitary sheet is stretched such that the stretching ratio in the transverse direction is 5 to 8 and also more than 1.5 times the stretching ratio in the lengthwise direction.

21. The pressure sensitive adhesive tape of claim 4, wherein said unitary sheet is stretched such that the stretching ratio in the transverse direction is 5 to 8 and also more than 1.5 times the stretching ratio in the lengthwise direction.

* * * * *